United States Patent [19]
Vavolotis

[11] 3,859,947
[45] Jan. 14, 1975

[54] LOCKING CHOCK
[76] Inventor: Andrew C. Vavolotis, 225 South St., West Bridgewater, Mass. 02379
[22] Filed: Aug. 23, 1973
[21] Appl. No.: 391,151

[52] U.S. Cl.............. 114/218, 24/115 H, 24/136 R, 292/57
[51] Int. Cl............................................ B63b 21/04
[58] Field of Search .......... 114/218, 199, 101, 102, 114/39, 230, 235; 254/190 R, 190 A, 190 C; 24/115 H, 115 K, 136 A, 136 R, 201 LP, 201 SL; 292/57, 302; 280/515; 16/210, 213, 214, 16/215

[56] References Cited
UNITED STATES PATENTS
| 67,156 | 7/1867 | Barr | 254/190 R |
|---|---|---|---|
| 1,508,029 | 9/1924 | Segal | 292/57 |
| 1,751,309 | 3/1930 | Demone | 24/115 R |
| 2,377,576 | 6/1945 | Rogers | 292/283 |
| 3,251,329 | 5/1966 | Smith | 114/102 |

Primary Examiner—Trygve M. Blix
Assistant Examiner—Gregory W. O'Connor
Attorney, Agent, or Firm—Weingarten, Maxham & Schurgin

[57] ABSTRACT

A chock which can be readily and selectively locked in a closed position to provide a fully enclosed fairlead and unlocked in an open position for easy removal of a line. The chock includes a locking pin slidable between the operative positions and rotatable to latch the pin in its locked position.

7 Claims, 3 Drawing Figures

PATENTED JAN 14 1975　　　　3,859,947

LOCKING CHOCK

FIELD OF THE INVENTION

This invention relates to marine fittings and more particularly to chocks.

BACKGROUND OF THE INVENTION

A chock employed for guiding a line aboard a marine vessel or other structure generally includes a pair of confronting members which extend upwardly from a base and inwardly in confronting spaced relations to one another. A line to be guided by the chock is inserted in the space between the confronting members and is retained by one or the other of the inwardly directed arms to provide guidance of the assoicated line. Such chocks have been substantially of the same general design for many years and are quite satisfactory in many instances. However, in some instances a line disposed within the chock can become free such as by relative upward movement between the fitting and the line, the loose line being a cause of possible damage to the vessel, or causing other deleterious results depending upon the particular nature of the line being guided. For example, chocks are usually employed at the bow of a boat to guide anchor lines or chains, and with a chock of conventional construction it is possible for the line to work loose by becoming separated from the chock via the opening between the confronting arms thereof. The separated line can damage the vessel or associated rigging or can become fouled since it is not properly guided along an intended path.

There have heretofore been attempts to provide a locking chock for enclosing a line but such approaches have been rather cumbersome in construction and use and have not met with commercial success. A prior art locking chock is shown in U.S. Pat. No. 1,287,333 wherein a central portion of the chock is of generally T-shaped configuration, when viewed in elevation, this portion being rotatable between an open and closed position and retained by a locking linkage. Another prior art construction is shown in U.S. Pat. No. 1,011,726 wherein the chock can be locked by movement of one arcuate arm into engagement with the other by means of a detent mechanism. These designs suffer from relatively complex construction and cumbersome operating mechanism and neither has met with any appreciable use in practice.

SUMMARY OF THE INVENTION

In accordance with the present invention, a locking chock is provided which is of relatively simple construction and which is extremely efficient for use even under adverse marine conditions. The chock, which can be embodied in a variety of fittings to suit particular usage, includes a channel for guiding a line, and a locking pin slidably moveable from an unlocked open position to a locked closed position, and which can be latched in its locked position by rotation of the pin. In its open position, the chock provides an unobstructed channel for disposition and guidance of a line, and by simple sliding and rotary motion of the locking pin the line is wholly enclosed within the chock to prevent the premature removal of the line therefrom.

DESCRIPTION OF THE DRAWING

The invention will be more fully understood from the following detailed description taken in conjunction with the accompanying drawing in which.

DETAILED DESCRIPTION OF THE INVENTION

Figures 1, 2, 3:
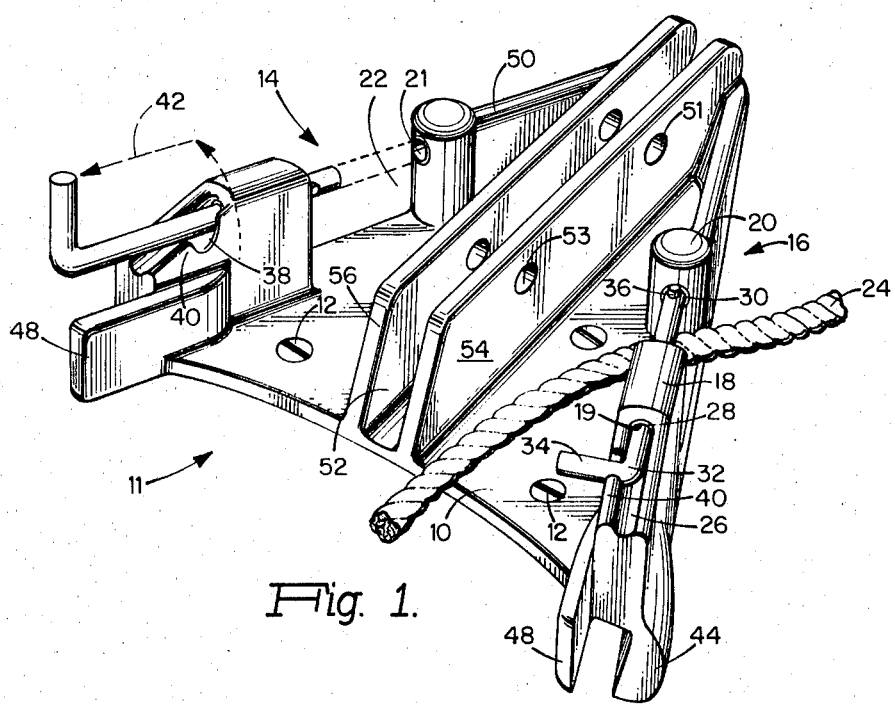
FIG. 1 is a pictoral view of the invention as embodied in a stemhead fitting.
FIG. 2 is a pictoral view of an alternative embodiment of the invention.
FIG. 3 is an elevation view of the embodiments of FIGS. 1 and 2 in typical installation on a boat.

The invention as embodied in a stemhead fitting adapted for installation at the bow of a boat is depicted in FIG. 1. The fitting 11 is of generally triangular configuration and is dimensioned and configured to be attached on the desk surface at the bow of a particular vessel. In the illustrated embodiment, a pair of locking chocks, 14 and 16, each constructed and operative according to the invention, are provided on respective sides of the fitting. The fitting includes a base member 10 having openings 12 therethrough to accommodating fasteners for attaching the fitting to the vessel bow. Since chocks 14 and 16 are identical only, one will be described herein for purposes of illustration.

Each chock includes first and second upstanding members 18 and 20 in spaced apart relationship and defining a generally U-shaped opening 22 through which a line 24 can be guided and retained. An opening is provided through the raised portion of member 18 and which is in alignment with an arcuate groove 26 in the upper surface of member 18. A blind opening is provided in member 20 and in coaxial alignment with the opening through member 18. A bushing 28 can be provided in opening 19, through member 18, and a similar bushing 30 can be provided in opening 21 in member 20. A cylindrical pin 32 is slidably disposed within opening 19 through member 18 and includes a handle portion 34 orthogonally disposed with respect with the axis of pin 32 and by which the pin is operative, as will be described. A retaining post 36 is provided near the end of pin 32 opposite to handle portion 34 which serves as a stop to retain the pin within member 18.

The chock 16 is shown in its locked closed position, while chock 14 is shown in the unlocked open position. In the closed position, pin 32 is disposed with the end opposite to handle portion 34 secured within opening 21 and with handle portion 34 located into engagement with a groove 38 provided in a flange 40 of member 18. In this locked position, the chock fully encloses line 24 disposed through opening 22 thereby preventing premature removal of the line. The chock is readily opened as illustrated by dotted arrows 42, by rotation of handle portion 34 out of engagement with associated groove 38 and slidable withdrawal of pin 32 from opening 31 into a fully opened position with post 36 in engagement with member 18, as illustrated by chock 14 in FIG. 1. In the opened position, a line can be readily removed from opening 22.

The chock and fitting 11 in which it is embodied are constructed to not interfere with lines which could otherwise become snagged thereon. With handle portion 34 in its closed position, as illustrated by chock 16 of FIG. 1, is relatively smooth contour is provided by the upper surfaces of pin 32, flange 40 and associated portions of the fitting to minimize opportunity for snagging of lines which may be present in the area of the fitting. The fitting is cast of a suitable material such as aluminum and has relatively smooth and rounded surfaces.

The fitting as installed at the bow of a boat is illustrated in FIG. 3 and it is seen that the downwardly extending lip portion 44 is in intimate engagement with the gunwale 46 to effectively provide a continuation of the bow surfaces. Flanges 48 are provided on each side of the fitting as illustrated to provide a transitional surface at the rearwardly facing end of the fitting for guidance of a line. Flanges 50 are provided at the forwardly directed sides of the fitting for structural strength and to continue the overall unobstructed contour of the fitting. A pair of spaced confronting flanges 54 and 56 are provided which extend along the longitudinal axis of the fitting and which define a centrally disposed channel 52. Transverse openings 51 and 53 are provided in flanges 54 and 56 for accomodating respective pins such as for retaining jib and fore stays.

The pin 32 is typically formed of stainless steel and bushings 28 and 30 are of suitable plastic material such as Teflon to prevent corrosive activity between the stainless steel pin and the aluminum of which the fitting is cast. It will be appreciated that the fitting and slidable pin can be constructed of one material, such as marine bronze, in which case bushings are not needed to prevent corrosive activity, although bushings are still useful to minimize wear between the slidable pin and the associated openings of the fitting.

The invention is illustrated in FIG. 2 as embodied in a single chock fitting adapted for mounting on the gunwale of a boat or other structure. The chock 61 is constructed and is operative similarly to the chocks described above in connection with FIG. 1. The base member in the embodiment of FIG. 2 includes a generally rectangular portion 60 having openings 62 through which fasteners 64 are disposed for attachment of the chock to a mounting surface 66. A flange portion 68 is integrally formed with base 60 and is downwardly extending in orthogonal disposition to the plane of base 60 for engagement with and attachment to an orthogonal mounting surface 70, such as by fasteners 72 provided in openings through flange 68. This latter embodiment is illustrated in typical installation aboard a vessel in FIG. 3.

It will be appreciated that the invention can be embodied in different configurations and of different materials to suit specific performance requirements. Accordingly, it is not intended to limit the invention by what has been particularly shown and described except as indicated in the appended claims.

What is claimed is:

1. A locking chock comprising:
    a base member adapted for mounting on a surface;
    first and second spaced confronting pedestal portions integral with said base member and having smoothly rounded surfaces and defining a channel for guidance of a line extending therethrough;
    said first pedestal having an opening therethrough, said second pedestal portion having a blind opening therein in alignment with the opening in said first pedestal portion;
    a locking pin slidably disposed in said opening in said first pedestal portion and movable between an open and a closed position, and having a stop post at one end of said locking pin adjacent said second pedestal portion and operative to engage said first pedestal portion to limit the extent of openinng of said locking pin, and a handle portion at the end opposite to said stop post;
    said first pedestal portion including an arcuate groove in alignment with said opening therethrough and providing a continuation of said opening for support of said locking pin slidably disposed in said opening; and
    a locking groove in said first pedestal portion angularly disposed with respect to said arcuate groove and cooperative with the handle portion of said locking pin in a locked position; and
    said locking pin handle portion being angularly disposed with respect to said locking pin and operative to be retained by said locking groove when said locking pin is in its locked position.

2. A locking chock according to claim 1 including first and second bushings each disposed in a respective opening in said first and second pedestal portions, said bushings being of a material to prevent corrosive activity between the material of said locking pin and the material of said pedestal portions and to minimize wear between said locking pin and the associate openings.

3. A locking chock according to claim 2 wherein said base member and integral pedestal portions are formed of aluminum, said locking pin is formed of stainless steel, and said bushings are formed of a plastic material.

4. A locking chock according to claim 1 wherein said first pedestal portion includes an integrally formed wall portion confronting said arcuate groove and operative to limit the rotational movement of said locking pin and to define an unlocked position.

5. A marine fitting comprising:
    a generally triangular base member adapted for mounting at the bow of a vessel;
    first and second locking chocks each disposed on a respective side and upstanding from said base member, each of said locking chocks including:
    first and second spaced confronting pedestal portions integral with said base member, each first pedestal portion having an opening therethrough, said second pedestal portion having a blind opening therein in alignment with said opening of said first pedestal portion;
    a locking pin slidably disposed in said opening in said first pedestal portion and movable between an open and a closed position, said locking pin having a stop post at one end of said locking pin adjacent said second pedestal portion and operative to engage said first pedestal portion to limit the extent of opening of said locking pin; and
    a handle portion angularly disposed at the end of said locking pin opposite to said stop post; and
    a locking groove in said first pedestal portion cooperative with said handle portion to retain said locking pin in its locked position;
    first and second spaced confronting flanges integrally formed with said base member and upstanding therefrom along a central axis thereof and have openings therethrough for retention of mounting hardware; and
    a flange joining each of said second pedestal portions and one end of said spaced flanges to enhance the strength of said fitting and to provide a smoothly contoured surface.

6. A fitting according to claim 5 including first and second flanges each integral with said base member and with a respective one of said first pedestal portions and extending beyond the periphery thereof.

7. A fitting according to claim 5 wherein said base member includes a generally U-shaped flange integral with said base member and downwardly extending therefrom and configured for engagement with a mounting surface of a vessel.

* * * * *

UNITED STATES PATENT OFFICE
CERTIFICATE OF CORRECTION

PATENT NO. : 3,859,947
DATED : January 14, 1975
INVENTOR(S) : Andrew C. Vavolotis It is certified that error appears in the above-identified patent and that said Letters Patent are hereby corrected as shown below:

Column 1, line 12, change "relations" to --relation--.

Column 2, line 18, change "desk" to --deck--.

Column 2, line 66, "Fig. 1, is" should read --Fig. 1, a--.

Column 3, line 59, after "first pedestal" insert --portion--.

Column 4, line 1, change "openning" to --opening--.

Column 4, line 42, change "each" to --said--.

Signed and Sealed this third Day of February 1976

[SEAL]

Attest:

RUTH C. MASON
Attesting Officer

C. MARSHALL DANN
Commissioner of Patents and Trademarks